(No Model.)
J. H. ROWLETT.
REPLANTING ATTACHMENT FOR CULTIVATORS.
No. 473,964. Patented May 3, 1892.
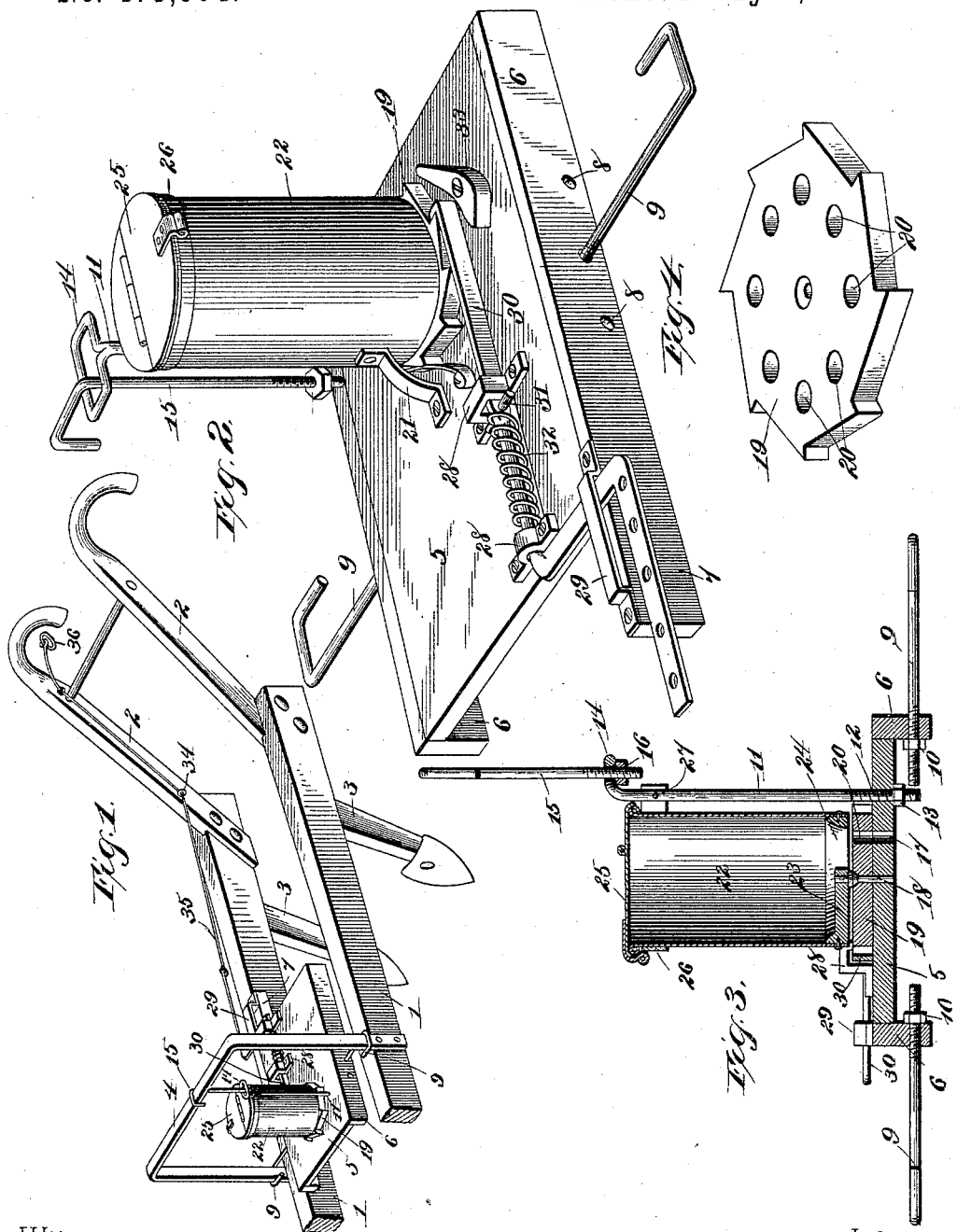
Witnesses:
Inventor:
J. H. Rowlett.
By his Attorneys,

UNITED STATES PATENT OFFICE.

JAMES H. ROWLETT, OF LUDLOW, MISSOURI.

REPLANTING ATTACHMENT FOR CULTIVATORS.

SPECIFICATION forming part of Letters Patent No. 473,964, dated May 3, 1892.

Application filed January 9, 1892. Serial No. 417,551. (No model.)

*To all whom it may concern:*

Be it known that I, JAMES H. ROWLETT, a citizen of the United States, residing at Ludlow, in the county of Livingston and State of Missouri, have invented a new and useful Replanting Attachment for Cultivators, of which the following is a specification.

This invention relates to improvements in replanting attachments for corn-cultivators; and the objects and advantages, together with the novel features thereof, will be hereinafter described, and particularly pointed out in the claims.

Referring to the drawings, Figure 1 is a perspective view of a corn-planter, my attachment being applied thereto. Fig. 2 is a detail perspective view of the attachment. Fig. 3 is a transverse section through the hopper and seed-disk. Fig. 4 is a detail in perspective of the seed-disk.

Like numerals of reference indicate like parts in all the figures of the drawings.

1 designates the opposite beams of a two-horse corn-cultivator; 2, the handles; 3, the cultivator-standards, and 4 the arch connecting the beams.

5 designates the platform or base of the attachment, and the same is provided at its opposite sides with depending flanges 6, one of which (that at the right hand) being extended, as at 7, in rear of the base 5. The flanges 6 are each provided with a series of three perforations 8, and from one perforation of each flange extends a supporting-hook 9, the inner ends of which are threaded and provided with taps or nuts 10. A vertical supporting-rod 11 is passed through a perforation 12, formed in the base at one side of its center, and the same has its lower end threaded and provided with a nut 13 and at its upper end is laterally bent, forming an eye 14. A hook 15 has its lower end extended through this eye, is threaded, and has applied thereto a nut 16, which prevents vertical withdrawal of the hook from the eye. The eye, being elongated, as shown, will permit of movement of the base and rod without disturbing the perpendicular position of the hook. This vertical hook takes over the arch, while the opposite side hooks 9 engage the vertical terminals or standards of the arch, and by operating the nuts the base may be thus adjusted vertically or laterally in either direction, and by adjusting the hooks 9 in the various perforations 8 a backward and forward adjustment may be obtained, which latter is permissible, so far as the vertical supporting-hook is concerned, by reason of the elongation given the eye at the upper end of the supporting-block.

A perforation 17 is formed in the base, and pivoted for rotation upon a vertical pin 18 at one side of the same is a ratchet seed-disk 19, provided with an annular series of perforations 20, adapted, by means hereinafter described, to be successively brought into alignment with the seed-opening 17 of the base. Short standards 21 are secured to the base at opposite sides of the seed-disk and support immediately above the disk a hopper 22, the bottom 23 of which forms a bearing for the pin 18 and is provided with an opening 24. The hopper is closed by an ordinary cover 25, and a band 26, passing about the hopper, has its terminals connected by a pin 27 to the supporting-rod 12. A pair of longitudinally-opposite keepers 28 is secured to the base, and a keeper 29 is secured to the extension 7 and disposed at a right angle to the keepers 28. A bayonet-shaped pawl 30 has its pawl end mounted for reciprocation in the keepers 28, and its laterally-disposed or intermediate portion mounted for movement in the keeper 29. A stop or shoulder 31 is formed upon the pawl 30, and a coiled spring 32 is mounted upon the pawl between the rear keeper 28 and the shoulder, the tendency of the spring being to force the pawl to the front, where it is guided into engagement with a ratchet-tooth of the disk 18 by means of a guide 33, located upon the base. Suitable guide-eyes 34 are secured to the beam and handle at the right of the cultivator, and a pull-wire 35 has one end secured to the rear end of the bayonet-shaped pawl, is passed through the guide-eyes, and terminates adjacent to the grip or handle of the cultivator in a ring 36, designed to be engaged by the forefinger of the right hand of the operator. The objects of these replanters are well known—they simply save the extra operation of going over the planted field for the purpose of replanting where the machine may have missed, and of accomplishing such replanting at the same time that the young corn is being cultivated.

It will be seen that I provide an attachment of great simplicity and durability, that is capable of being adjusted in all directions, so as to conform to the widths of various cultivators, and which is positive in its operation. As the cultivator moves along and a place is reached where it is desired to drop a grain or number of grains, the operator has simply to pull upon the wire by a movement of his forefinger, thus drawing the reciprocating pawl to the rear and moving the seed-disk one notch or tooth, which brings a succeeding perforation in the disk into register with the seed-opening 17 of the base. It will be seen that a predetermined number of seed can escape from the hopper at each pull of the wire.

Having thus described my invention, what I claim is—

1. The combination, with the two-horse cultivator comprising the inverted-U-shaped arch, of the replanting attachment comprising a base, and the hooks extending from the sides of the base and bottom of the base and engaging the top and sides of the arch, substantially as specified.

2. The combination, with the two-horse cultivator comprising the inverted-U-shaped arch, of the replanting attachment, the same comprising a base having a perforation and opposite depending side flanges, each having a perforation, hooks having threaded shanks mounted in these perforations and adapted to engage the top and sides of the arch, and nuts threaded on the inner ends or shanks of the hooks, substantially as specified.

3. The combination, with the two-horse cultivator comprising the inverted-U-shaped arch, of the replanting attachment comprising the base having the perforation and opposite side flanges, each having a series of perforations, a supporting-rod mounted in the perforation of the base and terminating at its upper end in an elongated bent eye, hooks mounted in the eye and in one of the perforations of each flange, said hooks engaging the top and sides of the arch, and nuts threaded on the ends of the hooks, substantially as specified.

4. In a replanting attachment, the combination, with the base, the hopper mounted thereon, and the ratchet seed-disk, of keepers mounted on the base in line with each other, a rear keeper disposed at an angle to the first mentioned, mounted on the extension of the base, a bayonet-shaped reciprocating pawl mounted in the keepers and provided with a shoulder, a coiled spring mounted on the pawl between the shoulder and the rear keeper, and a guide located at one side of and adjacent to the disk and adapted to guide the front end of the pawl into engagement with the disk, substantially as specified.

In testimony that I claim the foregoing as my own I have hereto affixed my signature in the presence of two witnesses.

JAMES H. ROWLETT.

Witnesses:
S. T. ROBINSON,
C. O. DEWEY.